United States Patent
Fukumoto et al.

(10) Patent No.: US 8,830,948 B2
(45) Date of Patent: Sep. 9, 2014

(54) MOBILE COMMUNICATION METHOD, MOBILE COMMUNICATION SYSTEM, AND RADIO BASE STATION

(75) Inventors: Satoru Fukumoto, Yokosuka (JP); Hiroyuki Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 117 days.

(21) Appl. No.: 13/500,306

(22) PCT Filed: Oct. 5, 2010

(86) PCT No.: PCT/JP2010/067426
§ 371 (c)(1),
(2), (4) Date: May 22, 2012

(87) PCT Pub. No.: WO2011/043321
PCT Pub. Date: Apr. 14, 2011

(65) Prior Publication Data
US 2012/0224560 A1    Sep. 6, 2012

(30) Foreign Application Priority Data

Oct. 7, 2009  (JP) .................................. 2009-233915

(51) Int. Cl.
*H04W 72/04* (2009.01)
*H04J 13/00* (2011.01)
*H04J 13/22* (2011.01)
*H04L 5/00* (2006.01)

(52) U.S. Cl.
CPC ............. *H04J 13/0062* (2013.01); *H04J 13/22* (2013.01); *H04L 5/0053* (2013.01)
USPC ............................ 370/330; 370/328; 370/329

(58) Field of Classification Search
None
See application file for complete search history.

(56) References Cited

U.S. PATENT DOCUMENTS

| 2007/0165588 A1* | 7/2007 | McCoy ......................... 370/344 |
| 2007/0230600 A1* | 10/2007 | Bertrand et al. .............. 375/260 |
| 2008/0316961 A1* | 12/2008 | Bertrand et al. .............. 370/329 |
| 2009/0073944 A1* | 3/2009 | Jiang et al. ..................... 370/338 |
| 2009/0109908 A1* | 4/2009 | Bertrand et al. .............. 370/329 |
| 2010/0046425 A1* | 2/2010 | Baldemair et al. ............ 370/328 |
| 2010/0098189 A1 | 4/2010 | Oketani |

FOREIGN PATENT DOCUMENTS

| WO | 2007/126793 A2 | 11/2007 |
| WO | 2009/093628 A1 | 7/2009 |

OTHER PUBLICATIONS

3GPP—Random Access Channel Structure for E-UTRA Uplink, R1-060322, Feb. 13-17, 2006.*
3GPP—Investigations on Random Access Channel Structure, R1-060992, Mar. 27-31, 2006.*
3GPP—Ericcson, E-UTRA Scalability of Random Access Preamble with cyclic prefix, R1-062274, Sep. 1, 2006.*

(Continued)

*Primary Examiner* — Brian D Nguyen
*Assistant Examiner* — Tejis Daya
(74) *Attorney, Agent, or Firm* — Osha Liang LLP (57) ABSTRACT

A mobile communication method according to the present invention includes a step of assigning one or a plurality of Zadoff-Chu sequences to each of cells #A to #G, a step of generating a plurality of RACH preambles by performing a cyclic shift with respect to the assigned Zadoff-Chu sequences by a predetermined period Ncs in each of the cells #A to #G, and a step of acquiring the reception timing distribution of the RACH preambles in the predetermined period Ncs in each of the cells #A to #G.

7 Claims, 10 Drawing Sheets

(56) References Cited

OTHER PUBLICATIONS

International Search Report w/translation from PCT/JP2010/067426 dated Nov. 9, 2010 (2 pages).
TSG-RAN WG1 Meeting #47bis, R1-070189; "Zadoff-Chu sequence allocation on RACH for complexity reduction"; Panasonic et al.; Sorrento, Italy; Jan. 15-19, 2007 (4 pages).
3GPP TS 36.211 v8.7.0; "3rd Generation Partnership Project; Technical Specification Group Radio Access Network; Evolved Terrestrial Radio Access (E-UTRA); Physical Channels and Modulation (Release 8)"; May 2009 (83 pages).
Extended European Search Report issued in counterpart European Patent Application No. 10821991.6 dated Dec. 18, 2013 (5 pages).

* cited by examiner

MOBILE COMMUNICATION METHOD, MOBILE COMMUNICATION SYSTEM, AND RADIO BASE STATION

TECHNICAL FIELD

The present invention relates to a mobile communication method and to a radio base station.

BACKGROUND ART

In general, in a mobile communication system, a random access procedure is used for an initial connection. In a mobile communication system employing an LTE (Long Term Evolution) scheme, a channel for the random access procedure is called PRACH (Physical Random Access Channel). Furthermore, in the LTE scheme, the random access procedure is also used for a handover, data communication resumption and the like, in addition to the initial connection.

The LTE mobile communication system is configured to assign one or a plurality of Zadoff-Chu sequences to each cell as "RACH root sequence" of the PRACH so as to ensure 64 RACH preambles per one cell.

Here, the Zadoff-Chu sequence has characteristics that the amplitude is constant in a temporal domain and a frequency domain and self-correlation is 0, and sequences obtained by performing a cyclic shift with respect to the Zadoff-Chu sequences are orthogonal to one another. There are 838 types of the Zadoff-Chu sequences.

Figure 9:
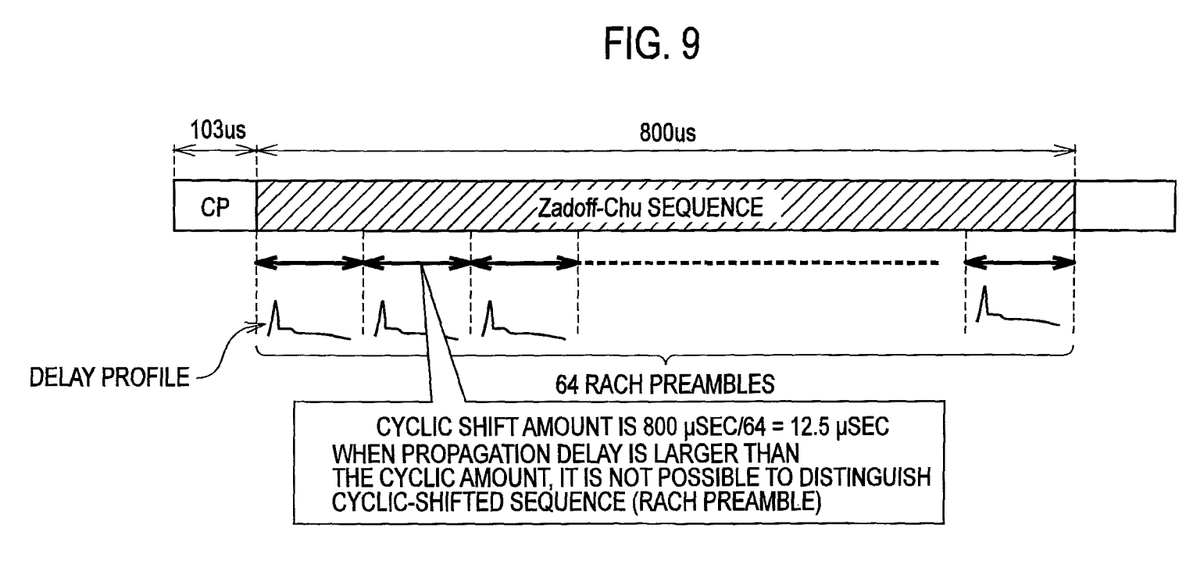
FIG. 9 is a diagram explaining an RACH preamble used in a conventional mobile communication system.

Specifically, as illustrated in FIG. 9, a cyclic shift is performed with respect to one or a plurality of Zadoff-Chu sequences by a predetermined cyclic shift amount (12.5 μsec in the example of FIG. 9), so that it is possible to ensure the 64 RACH preambles per one cell. Here, a value such as 800 μsec or 12.5 μsec is for illustrative purposes only.

In addition, the number of RACH preambles generable from one Zadoff-Chu sequence depends on a cell configuration (for example, a cell radius, a propagation delay state, the presence or absence of high speed movement compatibility).

Here, when a propagation delay between a radio base station eNB and a mobile station UE is larger than the above-mentioned cyclic shift amount, it is not possible for the radio base station eNB to recognize whether propagation is delayed by a cyclic shift or an actual propagation delay.

Figure 10:
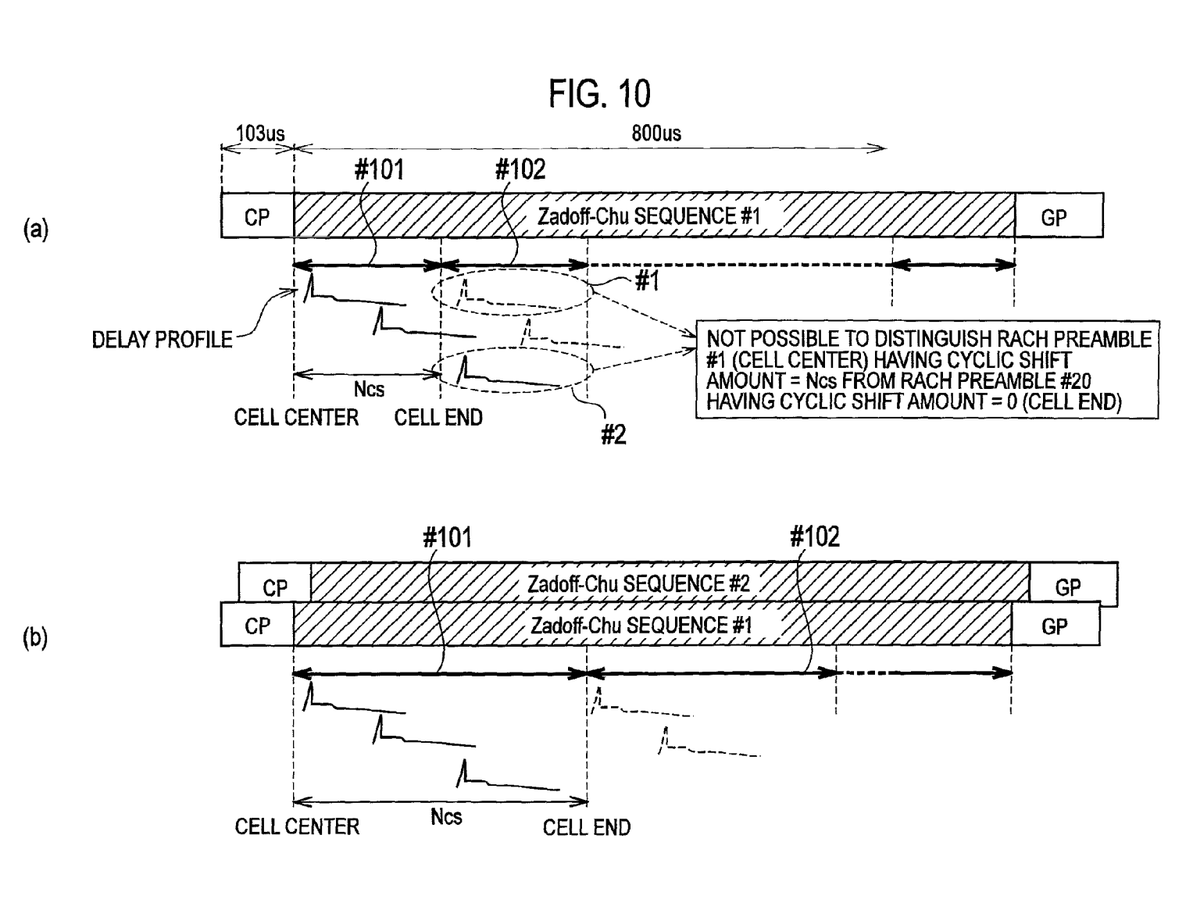
FIG. 10 is a diagram explaining an RACH preamble used in a conventional mobile communication system.

Specifically, as illustrated in FIG. 10(a), when a propagation delay is larger than the above-mentioned cyclic shift amount Ncs, it is not possible for the radio base station eNB to distinguish an RACH preamble #1 (an RACH preamble #1 from a mobile station UE positioned at the center of a cell), which has a cyclic shift amount of "Ncs", from an RACH preamble #2 (an RACH preamble #2 from a mobile station UE positioned at the end of a cell), which has a cyclic shift amount of "0", in a reception window #102.

In such a case, at the time of a cell design work, as illustrated in FIG. 10(b), in order to allow the cyclic shift amount Ncs to increase and ensure 64 RACH preambles per one cell, it is necessary to increase the number of Zadoff-Chu sequences to be assigned to the cell.

As described above, in the LTE scheme, it is necessary to perform design, that is, perform planning, of an RACH root sequence of PRACH to be assigned to each cell. Furthermore, in the design of the RACH root sequence, it is necessary to consider a cell configuration (for example, a maximum transmission delay in a cell).

However, in general, in the step of the design of the RACH root sequence, it is difficult to accurately estimate the above-mentioned maximum transmission delay and the like in the cell. Furthermore, after a mobile communication system starts to operate, the cell configuration (for example, the maximum transmission delay in the cell) may be changed. Even in this case, it is difficult to accurately estimate the above-mentioned maximum transmission delay and the like in the cell.

In such a case, conventionally, since it is necessary for a network operator to perform field measurement and the like and perform a cell design work (specifically, an assignment work of an RACH preamble) again, great effort is required, resulting in an inefficiency problem.

SUMMARY OF THE INVENTION

Therefore, the present invention has been achieved in view of the above-described problems, and an object thereof is to provide a mobile communication method, by which it is possible to efficiently reassign an RACH preamble, and a radio base station therefor.

A first characteristic of the present embodiment is summarized in that a mobile communication method, comprising, a step of assigning predetermined sequences, in which an amplitude is constant in a temporal domain and a frequency domain and self-correlation is 0, to each cell, a step of generating a plurality of preambles by performing a cyclic shift with respect to the predetermined sequences by a predetermined period in each cell, and a step of acquiring a reception timing distribution of preambles in the predetermined period in each cell.

A second characteristic of the present embodiment is summarized in that a radio base station used in a mobile communication system configured to assign predetermined sequences, in which an amplitude is constant in a temporal domain and a frequency domain and self-correlation is 0, to each cell, and generate a plurality of preambles by performing a cyclic shift with respect to the predetermined sequences by a predetermined period, comprising, an acquisition unit configured to acquire a reception timing distribution of preambles in the predetermined period in each cell.

A third characteristic of the present embodiment is summarized in that a mobile communication system including a radio base station and a controller, in which the radio base station comprises, a generation unit configured to generate a plurality of preambles by performing a cyclic shift with respect to the predetermined sequences, by a predetermined period, in which an amplitude is constant in a temporal domain and a frequency domain and self-correlation is 0, to each cell, and, an acquisition unit configured to acquire a reception timing distribution of preambles in the predetermined period in each cell; and a setting unit configured to calculate a number of the predetermined sequences or a length of the predetermined period, which are to be assigned to the each cell, based on the reception timing distribution, and to notify the controller of the number of the predetermined sequences or the length of the predetermined period, and the controller comprises: an assignment unit configured to assign the predetermined sequences to be different from sequences of a neighboring cell to each cell based on the notified number of the predetermined sequences or length of the predetermined period.

DETAILED DESCRIPTION (Configuration of Mobile Communication System According to First Embodiment of the Present Invention)

A description will now be provided for the configuration of a mobile communication system according to a first embodiment of the present invention, with reference to FIG. 1 to FIG. 6.

Figure 1:
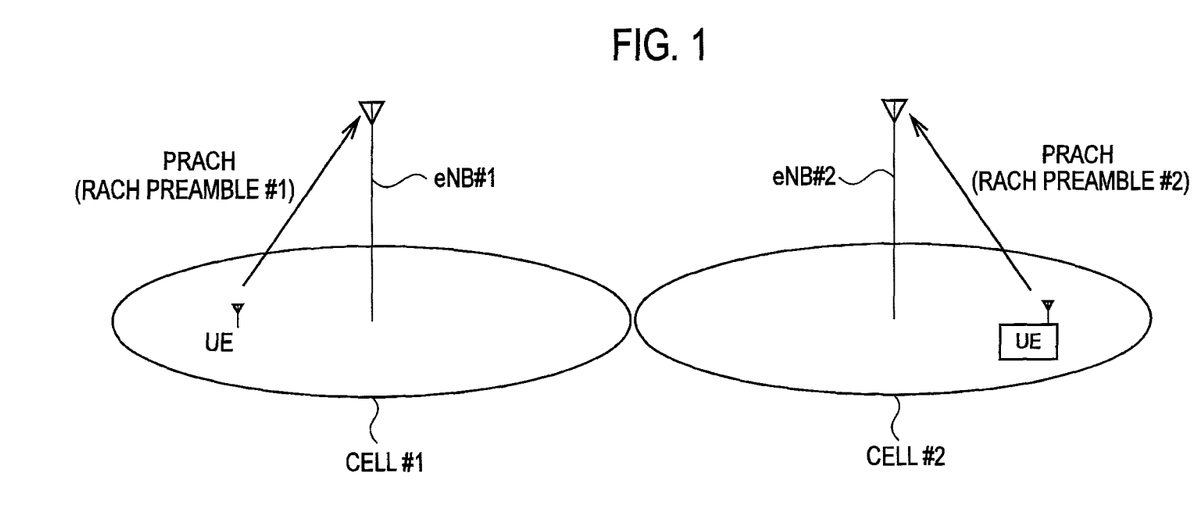
FIG. 1 is a diagram showing the entire configuration of a mobile communication system according to a first embodiment of the present invention.

The mobile communication system according to the present embodiment is an LTE mobile communication system. As illustrated in FIG. 1, in the mobile communication system according to the present embodiment, a mobile station UE is configured to transmit an RACH preamble #1, which has been assigned to a cell #1, to a radio base station eNB #1 via PRACH (Physical Random Access Channel) in the cell #1, and to transmit an RACH preamble #2, which has been assigned to a cell #2, to a radio base station eNB #2 via the PRACH in the cell #2.

Here, the RACH preamble #1 is generated by performing a cyclic shift with respect to a Zadoff-Chu sequence, which has been assigned to the cell #1, by a predetermined cyclic shift amount (a predetermined period) Ncs, and the RACH preamble #2 is generated by performing a cyclic shift with respect to a Zadoff-Chu sequence, which has been assigned to the cell #2, by a predetermined cyclic shift amount (a predetermined period) Ncs.

Figure 2:
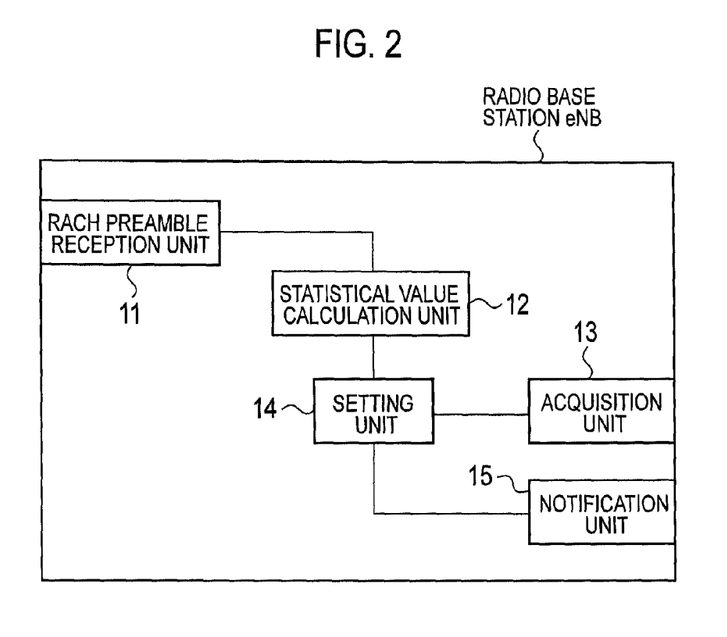
FIG. 2 is a functional block diagram of a radio base station according to the first embodiment of the present invention.

As illustrated in FIG. 2, the radio base station eNB includes an RACH preamble reception unit 11, a statistical value calculation unit 12, an acquisition unit 13, a setting unit 14, and a notification unit 15.

The RACH preamble reception unit 11 is configured to receive an RACH preamble transmitted by a mobile station UE positioned in a subordinate cell via the PRACH.

Here, the RACH preamble reception unit 11 is configured to attempt the reception of predetermined RACH preambles in each reception window. In addition, the length (a predetermined period) of each reception window corresponds to a cyclic shift amount by which a cyclic shift has been performed when the predetermined RACH preambles are generated.

The statistical value calculation unit 12 is configured to acquire the reception timing distribution of the RACH preambles in the predetermined period Ncs in each cell. In addition, the reception timing of the RACH preamble may be equal to a value of Timing Advance (TA). Alternatively, the reception timing of the RACH preamble may have a value corresponding to the Timing Advance (TA).

Furthermore, the reception timing distribution of the RACH preambles may include the number of preambles in each of divided areas obtained by dividing a reception window into a predetermined number of areas. The predetermined number, for example, may be 10 or 64.

Figure 3:
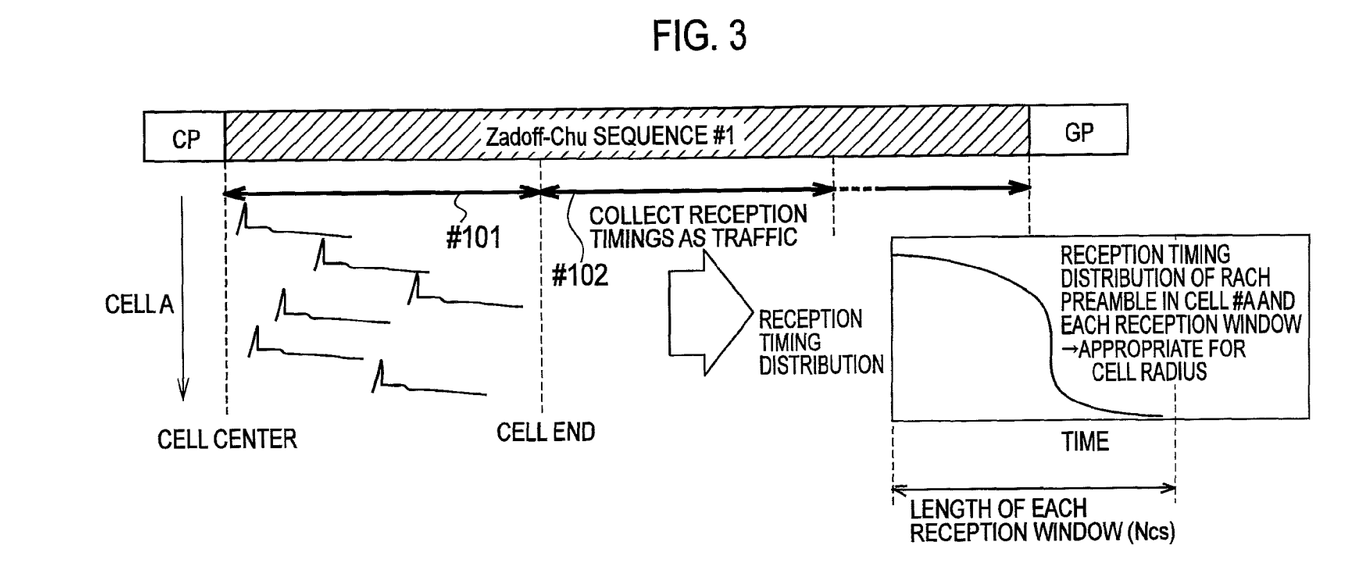
FIG. 3 is a diagram explaining an example of a method of calculating a statistical value by the radio base station according to the first embodiment of the present invention.

For example, as illustrated in FIG. 3, the statistical value calculation unit 12 is configured to acquire the reception timing distribution of RACH preambles in reception windows #101, #102, #103, . . . (the length (the size) of each reception window corresponds to the Ncs) in a cell #A.

In the example of FIG. 3, since the reception timings of the RACH preambles are uniformly distributed in the reception window #A, it is possible to determine that the lengths (that is, the cyclic offset amounts Ncs) of the reception windows #101, #102, #103, . . . are appropriate for the radius of the cell #A.

Figure 4:
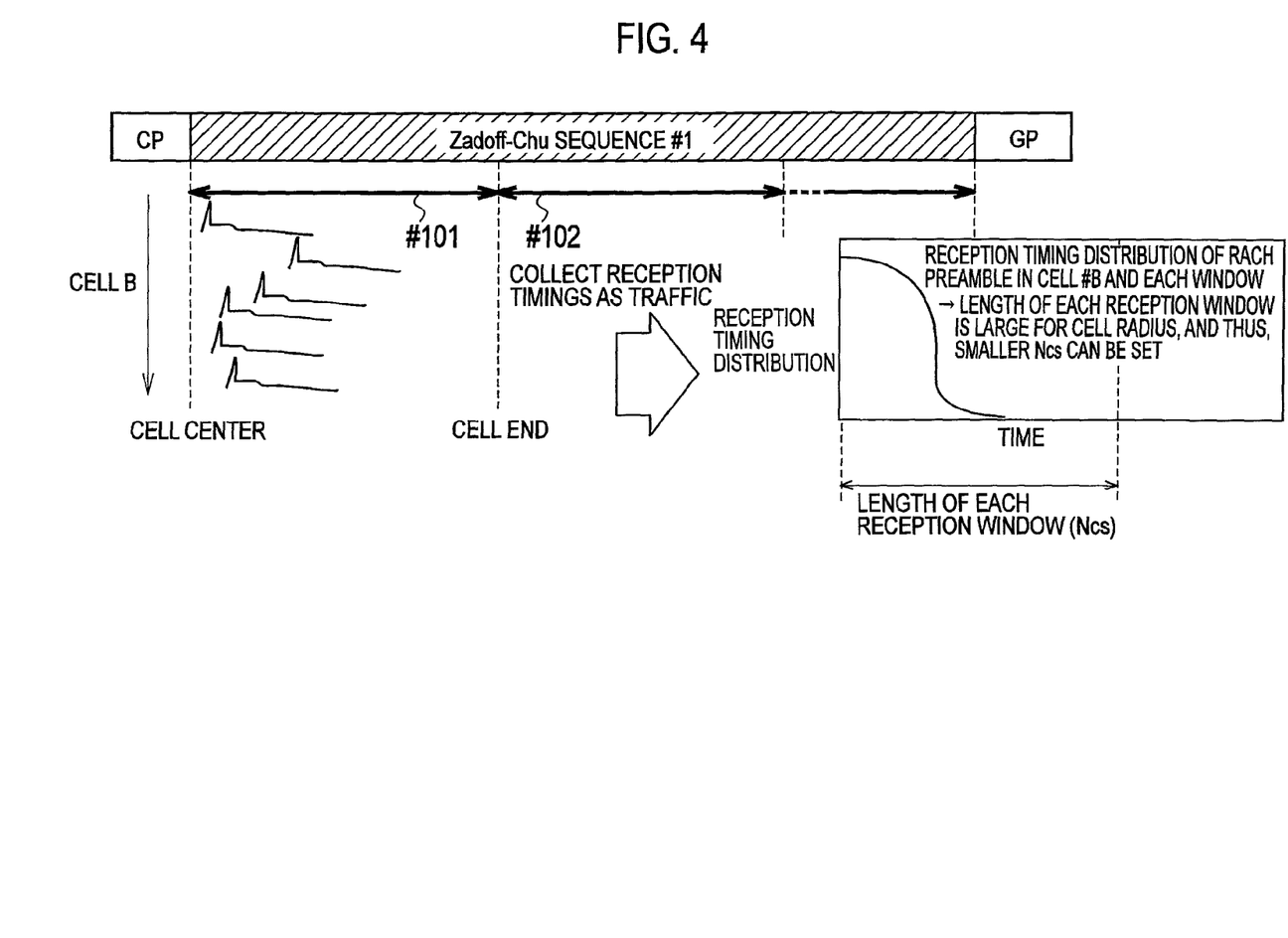
FIG. 4 is a diagram explaining an example of a method of calculating a statistical value by the radio base station according to the first embodiment of the present invention.

Furthermore, as illustrated in FIG. 4, the statistical value calculation unit 12 is configured to acquire the reception timing distribution of the RACH preambles in the reception windows #101, #102, #103, . . . (correspond to the Ncs) in a cell #B.

In the example of FIG. 4, since the distribution of the reception timings of the RACH preambles is biased in the first halves of the reception windows #101, #102, #103, . . . , it is possible to determine that the lengths (that is, the cyclic offset amounts Ncs) of the reception windows #101, #102, #103, . . . are too long for the radius of the cell #B.

Figure 5:
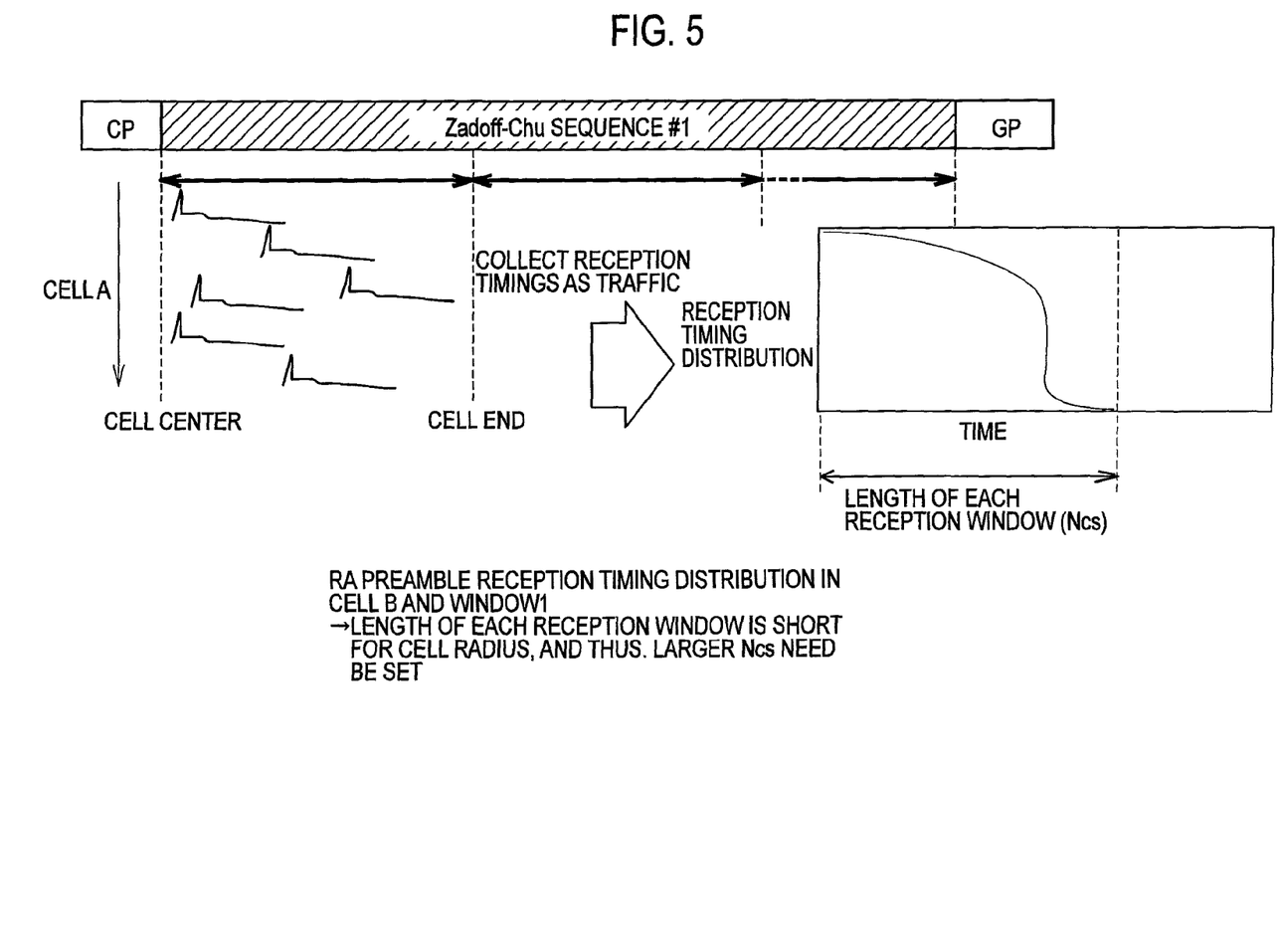
FIG. 5 is a diagram explaining an example of a method of calculating a statistical value by the radio base station according to the first embodiment of the present invention.

Furthermore, as illustrated in FIG. 5, the statistical value calculation unit 12 is configured to acquire the reception timing distribution of the RACH preambles in the reception windows #101, #102, #103, . . . (correspond to the Ncs) in a cell #C.

In the example of FIG. 5, since the reception timings of the RACH preambles are spread well into the second halves of the reception windows #101, #102, #103, . . . , it is possible to determine that the lengths (that is, the cyclic offset amounts Ncs) of the reception windows #101, #102, #103, . . . are too short for the radius of the cell #C.

In addition, since the cell #A, #B or #C in the above-mentioned example is for illustrative purposes only, the same determination may also be performed with respect to other cells.

The acquisition unit 13 is configured to acquire information on Zadoff-Chu sequences, which have been assigned to each cell, from a neighboring radio base station eNB.

The setting unit 14 is configured to set the number of Zadoff-Chu sequences and the length of the predetermined period (the cyclic offset amount) Ncs, which are to be assigned to each of cells #A to #G, based on the reception timing distribution of the RACH preambles in the reception windows in each cell, which has been acquired by the statistical value calculation unit 12.

For example, as with the case of FIG. 4, in the case in which it is determined that the lengths (that is, the cyclic offset amounts Ncs) of the reception windows #101, #102, #103, . . . are too long for the radius of the cell #B, it is possible for the setting unit 14 to set the length of the cyclic offset amount Ncs to be shorter.

More specifically, for example, when CDF (Cumulative Distribution Function) is acquired from the above-mentioned reception timing distribution and reception timings at 90% point of the CDF are included within the first half 50% in the reception window, the setting unit 14 sets the length of the cyclic offset amount Ncs to be shorter. In other cases, the setting unit 14 may not set the length of the cyclic offset amount Ncs to be shorter, that is, may perform a process to maintain the current state.

In addition, since the value such as the 90% point of the CDF or within the first half 50% in the reception window is for illustrative purposes only, other values may also be used. That is, the setting unit 14 may perform setting regarding whether to reduce the length of the cyclic shift amount Ncs based on the above-mentioned reception timing distribution and a predetermined threshold value (the value such as the first half 50% in the reception window in the above-mentioned example).

More specifically, when the number of preambles received in the first half of the reception window is large, or when the rate of the preambles received in the first half of the reception window is high, the setting unit 14 may determine that the length of the cyclic shift amount Ncs is shorter.

Figure 6:
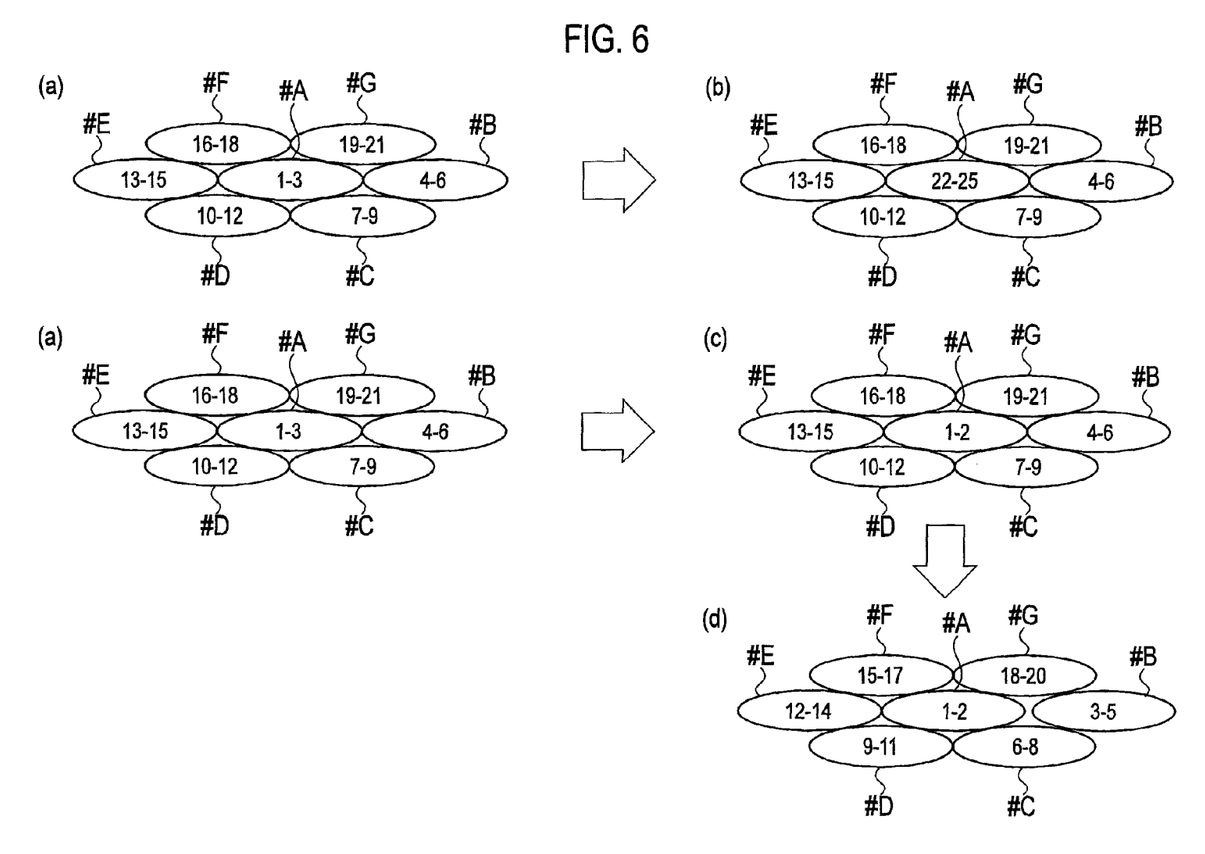
FIG. 6 is a diagram explaining an example of a method of re-planning assignment of a Zadoff-Chu sequence to each cell by the radio base station according to the first embodiment of the present invention.

In such a case, as illustrated in FIG. 6(*a*)→(*c*), the setting unit 14 may also be configured to reduce the number of Zadoff-Chu sequences to be assigned to the cell #A. Here, as illustrated in FIG. 6(*c*)→(*d*), the setting unit 14 may also be configured to change the type of Zadoff-Chu sequences to be assigned to neighboring cells of the cell #A, that is, the cell #B, the cell #C, the cell #D, the cell #E, the cell #F, and the cell #G.

Furthermore, in the case in which it is determined that the lengths (that is, the cyclic offset amounts Ncs) of the reception windows #101, #102, #103, . . . are too short for the radius of the cell #B, it is possible for the setting unit 14 to set the length of the cyclic offset amount Ncs to be longer.

More specifically, for example, when CDF (Cumulative Distribution Function) is acquired from the above-mentioned reception timing distribution, and reception timings at 90% point of the CDF are included within the last 20% in the reception window, the setting unit 14 sets the length of the cyclic offset amount Ncs to be longer. In other cases, the setting unit 14 may not set the length of the cyclic offset amount Ncs to be longer, that is, may perform a process to maintain the current state.

In addition, since the value such as the 90% point of the CDF or within the second half 20% in the reception window is for illustrative purposes only, other values may also be used. That is, the setting unit 14 may perform setting regarding whether to increase the length of the cyclic shift amount Ncs based on the above-mentioned reception timing distribution and a predetermined threshold value (the second half 20% in the reception window in the above-mentioned example).

More specifically, when the number of preambles received in the second half of the reception window is large, or when the rate of the preambles received in the second half of the reception window is high, the setting unit 14 may determine that the length of the cyclic shift amount Ncs is set to be longer.

In such a case, as illustrated in FIG. 6(*a*)→(*b*), the setting unit 14 may also be configured to increase the number of Zadoff-Chu sequences to be assigned to the cell #A.

Here, the setting unit 14 is configured to assign Zadoff-Chu sequences to the cell #A, which are different from the Zadoff-Chu sequences used in a cell subordinate to the neighboring radio base station eNB, which has been acquired by the acquisition unit 13.

Furthermore, in the same manner as the above-mentioned process when the number of the Zadoff-Chu sequences has been reduced, simultaneously the increase in the number of the Zadoff-Chu sequences to be assigned to the cell #A, the setting unit 14 may also be configured to change the type of Zadoff-Chu sequences to be assigned to the neighboring cells of the cell #A, that is, the cell #B, the cell #C, the cell #D, the cell #E, the cell #F, and the cell #G.

When predetermined conditions are satisfied, the setting unit 14 is configured to perform the re-setting the number of Zadoff-Chu sequences and the length of the predetermined period (the cyclic offset amount) Ncs as described above.

Furthermore, the setting unit 14 may also be configured to autonomously perform the above-mentioned setting as SON (Self Organize Network) or by a Plug & Play function.

Figure 7:
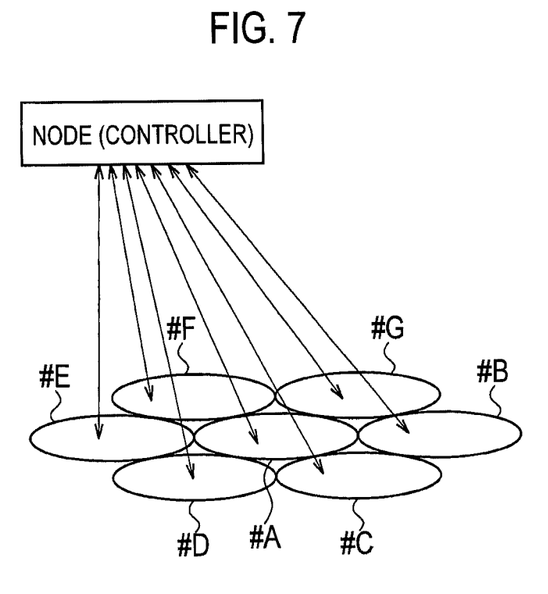
FIG. 7 is a diagram explaining an operation when SON or Plug & Play is performed in the mobile communication system according to the first embodiment of the present invention.

In addition, when the above-mentioned SON or Plug & Play is performed, a node (a controller) for the SON or Plug & Play may exist, and the node may autonomously perform the above-mentioned setting in cooperation with the setting unit 14 for each cell as illustrated in FIG. 7.

More specifically, through the above-mentioned process, the setting unit 14 for each cell calculates the number of the Zadoff-Chu sequences to be assigned to a corresponding cell and notifies the above-mentioned node (the controller) of the number of Zadoff-Chu sequences to be assigned to the corresponding cell.

Next, an assignment unit of the node (the controller) may also decide Zadoff-Chu sequences to be assigned to each cell such that the Zadoff-Chu sequences to be assigned to each cell are different from one another, based on the "number of Zadoff-Chu sequences to be assigned to the corresponding cell" notified by the setting unit 14 for each cell.

Then, the assignment unit of the node (the controller) notifies the setting unit 14 for each cell of the decided Zadoff-Chu sequences to be assigned to each cell.

Finally, the setting unit 14 for each cell sets the Zadoff-Chu sequences to be assigned to each cell, which has been notified by the node (the controller), as the Zadoff-Chu sequences of the corresponding cell.

In addition, the node (the controller) may also be called an aggregation node or a controller. Furthermore, in the above-mentioned process, in addition to the number of the Zadoff-Chu sequences to be assigned to the corresponding cell, a reception window size of preambles to be used in the corresponding cell may also be used.

The notification unit 15 is configured to notify the neighboring radio base station eNB of information on the Zadoff-Chu sequences assigned to the cell subordinate to the radio base station eNB.

Furthermore, the notification unit 15 is configured to notify a mobile station UE, which is positioned at the cell subordinate to the radio base station eNB, of the number of the Zadoff-Chu sequences and the length of the predetermined period (the cyclic offset amount) Ncs, which have been set by the setting unit 14.

The number of the Zadoff-Chu sequences and the length of the predetermined period (the cyclic offset amount) Ncs, which have been set by the setting unit 14, may also be notified to a mobile station UE as a part of broadcast information.

Alternatively, the number of the Zadoff-Chu sequences and the length of the predetermined period (the cyclic offset amount) Ncs, which have been set by the setting unit 14, may also be notified to a mobile station UE as a part of an RRC message.

Here, the RRC message, for example, may correspond to an HO command. In this case, the notification unit 15 may also notify a mobile station UE, which is transitioned to the corresponding cell through a handover, of the number of the Zadoff-Chu sequences and the length of the predetermined period (the cyclic offset amount) Ncs, which have been set by the setting unit 14, via the radio base station eNB serving as a handover source.

In addition, in the present embodiment, the example, in which the Zadoff-Chu sequence is used as the "RACH root sequence", has been described. However, as the "RACH root sequence", a CAZAC (Constant Amplitude Zero Auto-Correlation) sequence, such as a binary sequence by a Computer search, may also be used.

Operation of the Mobile Communication System According to the First Embodiment of the Present Invention With reference to FIG. 8, the operation of the mobile communication system according to the first embodiment of the present invention, specifically, the operation of the radio base station eNB according to the first embodiment of the present invention will be described.

Figure 8:
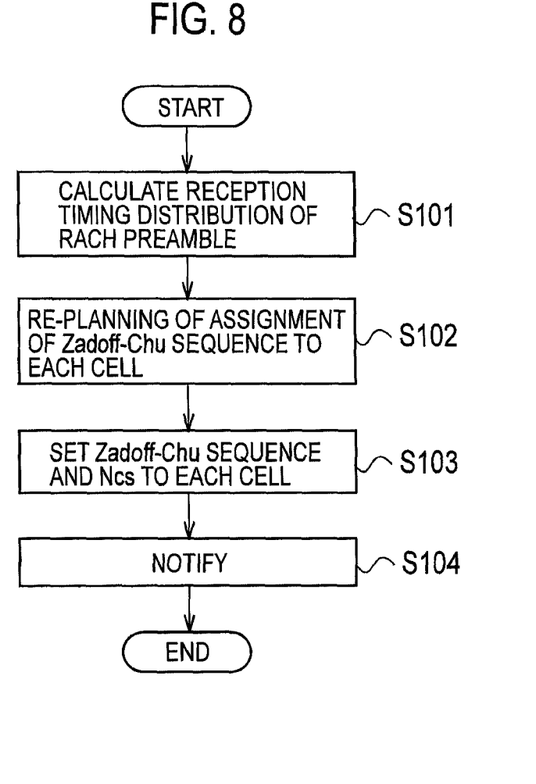
FIG. 8 is a flowchart illustrating an operation of the radio base station according to the first embodiment of the present invention.

As illustrated in FIG. 8, in step S101, the radio base station eNB acquires the reception timing distribution of predetermined RACH preambles in each reception window in a cell subordinate to the radio base station eNB.

In step S102, the radio base station eNB redesigns the assignment of Zadoff-Chu sequences to the cell subordinate to the radio base station eNB based on the reception timing distribution of the RACH preambles and Zadoff-Chu sequences used in a neighboring cell (for example, refer to FIG. 6).

The radio base station eNB assigns Zadoff-Chu sequences and a cyclic shift amount Ncs to the cell subordinate to the radio base station eNB in step S103, and notifies a mobile station UE and the neighboring cell of the assigned Zadoff-Chu sequences and cyclic shift amount Ncs in step S104.

In addition, the above-mentioned processes of step S101 to step 104 are performed in the neighboring cell in a continuous manner or a parallel manner, so that the planning of a RACH root sequence of PRACH may also be performed.

Furthermore, the above-mentioned processes of step S101 to step 104 are performed in the neighboring cell in a continuous manner or a parallel manner and autonomously performed, so that the planning of the RACH root sequence of the PRACH may also be performed in an SON manner.

Operation and Effect of the Mobile Communication System According to the First Embodiment of the Present Invention In accordance with the mobile communication system according to the first embodiment of the present invention, it is possible for a radio base station eNB to determine whether the lengths (that is, cyclic offset amounts Ncs) of reception windows #101, #102, #103, . . . are appropriate for the radius of a cell #A based on the reception timing distribution of predetermined RACH preambles in each reception window, and to redesign Zadoff-Chu sequences and a cyclic shift amount Ncs, which are to be assigned to a cell subordinate to the radio base station eNB, based on a result of the determination, so that it is possible to efficiently perform a cell redesign work according to a change in a cell configuration.

The characteristics of the present embodiment as described above may be expressed as follows.

A first characteristic of the present embodiment is summarized in that a mobile communication method includes: a step of assigning one or a plurality of Zadoff-Chu sequences (predetermined sequences in which the amplitude is constant in a temporal domain and a frequency domain and self-correlation is 0) to each of cells #A to #G; a step of generating a plurality of RACH preambles by performing a cyclic shift with respect to the assigned Zadoff-Chu sequences by a predetermined period Ncs in each of the cells #A to #G; and a step of acquiring the reception timing distribution of the RACH preambles in the predetermined period Ncs in each of the cells #A to #G.

In the first characteristic of the present embodiment, the mobile communication method may further include: a step of setting the number of the Zadoff-Chu sequences or the length of the predetermined period Ncs, which are to be assigned to each of the cells #A to #G, based on the reception timing distribution acquired in each of the cells #A to #G.

A second characteristic of the present embodiment is summarized in that a radio base station eNB, which is used in a mobile communication system configured to assign one or a plurality of Zadoff-Chu sequences to each of cells #A to #G and generate a plurality of RACH preambles by performing a cyclic shift with respect to the assigned Zadoff-Chu sequences by a predetermined period Ncs, includes: a statistical value calculation unit 12 (acquisition unit) configured to acquire the reception timing distribution of RACH preambles in the predetermined period Ncs in each of the cells #A to #G.

In the second characteristic of the present embodiment, the radio base station eNB may further include: a setting unit 14 configured to set the length of the predetermined period Ncs to be applied to the Zadoff-Chu sequences assigned to each of the cells #A to #G, based on the reception timing distribution acquired in each of the cells #A to #G.

In addition, the operation of the above-mentioned the base station device eNB or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the base station device eNB or mobile station UE. As a discrete component, such storage medium and processor may be arranged in the base station device eNB or mobile station UE.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication method, by which it is possible to efficiently reassign an RACH preamble, and a radio base station therefor.

The invention claimed is:

1. A mobile communication method, comprising:
a step of assigning predetermined sequences, in which an amplitude is constant in a temporal domain and a frequency domain and self-correlation is 0, to each cell;
a step of generating a plurality of preambles by performing a cyclic shift with respect to the predetermined sequences by a predetermined period in each cell; and
a step of acquiring a reception timing distribution of preambles in the predetermined period in each cell, wherein
the reception timing distribution of the preambles includes the number of preambles in each of divided areas obtained by dividing a reception window into a predetermined number of areas.

2. The mobile communication method according to claim 1, further comprising:
a step of setting a number of the predetermined sequences or a length of the predetermined period, which are to be assigned to the each cell, based on the acquired reception timing distribution in each cell.

3. The mobile communication method according to claim 1, further comprising:
in the step of assigning the predetermined sequences, the predetermined sequences are assigned to be different from sequences of a neighboring cell.

4. A radio base station used in a mobile communication system configured to assign predetermined sequences, in which an amplitude is constant in a temporal domain and a frequency domain and self-correlation is 0, to each cell, and generate a plurality of preambles by performing a cyclic shift with respect to the predetermined sequences by a predetermined period, comprising:
a processor configured to acquire a reception timing distribution of preambles in the predetermined period in each cell; wherein
the reception timing distribution of the preambles includes the number of preambles in each of divided areas obtained by dividing a reception window into a predetermined number of areas.

5. The radio base station according to claim 4, the processor configured to set a length of the predetermined period to be applied to the predetermined sequences assigned to each cell, based on the acquired reception timing distribution in each cell.

6. The radio base station according to claim 4, wherein the predetermined sequences are assigned to be different from sequences of a neighboring cell.

7. A mobile communication system including a radio base station and a controller, wherein the radio base station comprising a processor configured to:
generate a plurality of preambles by performing a cyclic shift with respect to the predetermined sequences, by a predetermined period, in which an amplitude is constant in a temporal domain and a frequency domain and self-correlation is 0, to each cell, and;
acquire a reception timing distribution of preambles in the predetermined period in each cell; and
calculate a number of the predetermined sequences or a length of the predetermined period, which are to be assigned to the each cell, based on the reception timing distribution, and to notify the controller of the number of the predetermined sequences or the length of the predetermined period, and
the controller comprising a processor configured to:
assign the predetermined sequences to be different from sequences of a neighboring cell to each cell based on the notified number of the predetermined sequences or length of the predetermined period, wherein
the reception timing distribution of the preambles includes the number of preambles in each of divided areas obtained by dividing a reception window into a predetermined number of areas.

* * * * *